United States Patent [19]

Lindsay et al.

[11] Patent Number: 5,050,055
[45] Date of Patent: Sep. 17, 1991

[54] HEAT DISSIPATING HIGH INTENSITY LAMP HOUSING

[75] Inventors: James R. Lindsay, Brea; Ronald A. Meyer, San Dimas; Alexander Garcia, Jr., Upland, Calif.; Alexander Waluszko, Pasadena, all of Calif.

[73] Assignee: UVP, Inc., San Gabriel, Calif.

[21] Appl. No.: 399,709

[22] Filed: Aug. 28, 1989

[51] Int. Cl.⁵ .............................................. F21V 29/00
[52] U.S. Cl. .................... 362/293; 362/294; 362/376
[58] Field of Search ............... 362/293, 294, 373, 376, 362/399

[56] References Cited

U.S. PATENT DOCUMENTS

| | | | |
|---|---|---|---|
| 3,348,036 | 10/1967 | Bodian et al. | 362/373 X |
| 3,502,858 | 3/1970 | Habro et al. | 362/373 |
| 3,927,314 | 12/1975 | Wiggerman | 362/293 |
| 4,142,227 | 2/1979 | Aikens | 362/373 X |
| 4,233,655 | 11/1980 | Zelina, Jr. et al. | 362/399 X |
| 4,388,674 | 6/1983 | Sano | 362/399 X |
| 4,535,397 | 8/1985 | May | 362/376 X |

OTHER PUBLICATIONS

"Ultraviolet Lamps and Equipment" UVP, Inc., Jun. 1987.

*Primary Examiner*—Ira S. Lazarus
*Assistant Examiner*—Richard R. Cole
*Attorney, Agent, or Firm*—Christie, Parker & Hale

[57] ABSTRACT

A high intensity lamp has a housing formed by first and second housing halves fitted together, a rear cover and a front cover. The first and second housing halves have a handle integrally formed therewith so that the lamp is portable. The housing encases a socket, the high intensity lamp source, a lamp shield and a filter, as well as part of a power cord. The front cover is releasably attached to the first and second housing halves. The filter is releasably attached to the housing halves by means of a retainer, disposed in the housing halves, having inwardly inclined tongs with respect to the housing, which hold therebetween a projection from the filter. The rear cover and each housing half has several elongated ventilation slots. The front cover has feet on which the lamp can rest. The feet are reinforced by ribs which serve, together with tabs, to hold a splash shield in place in the cover.

15 Claims, 6 Drawing Sheets

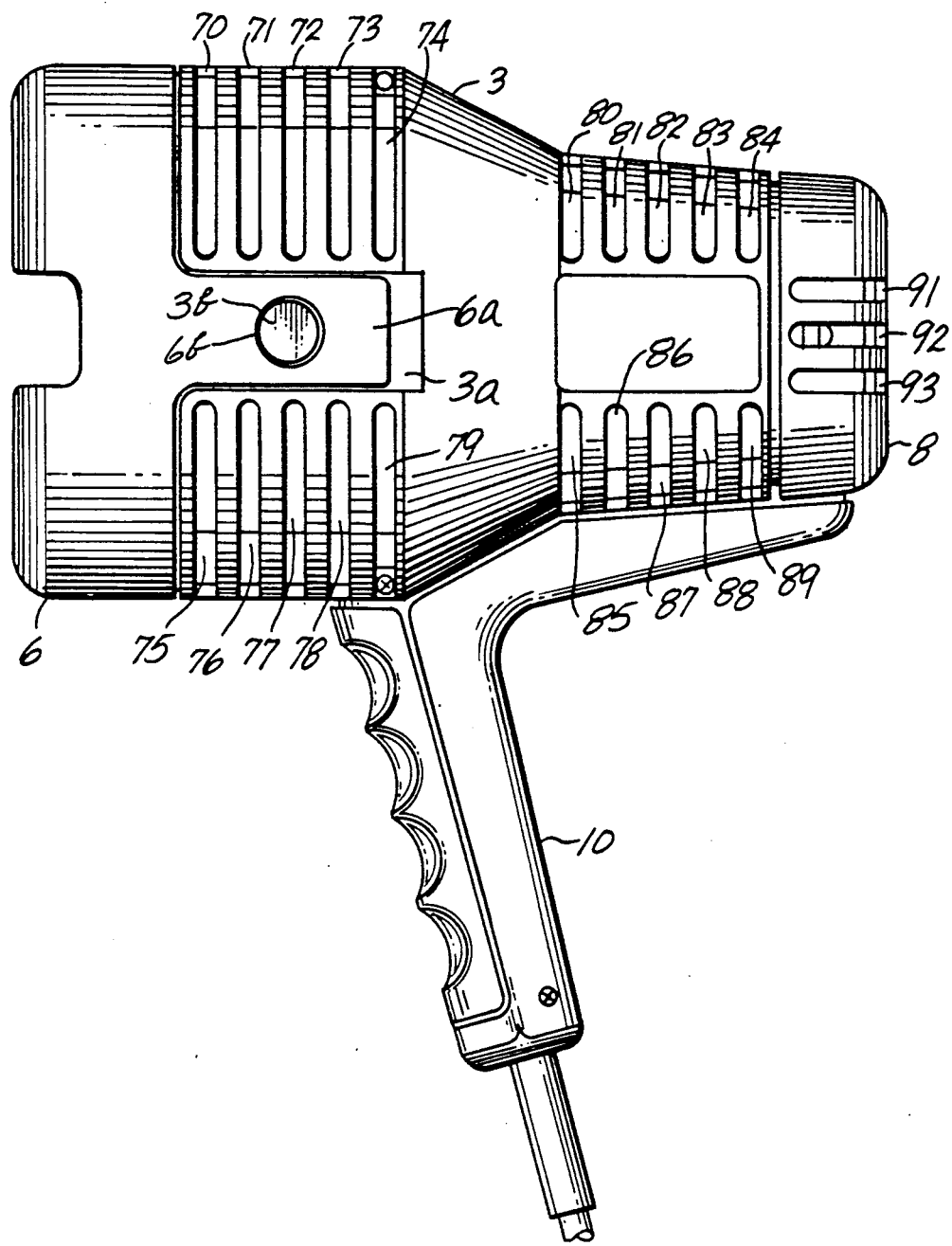

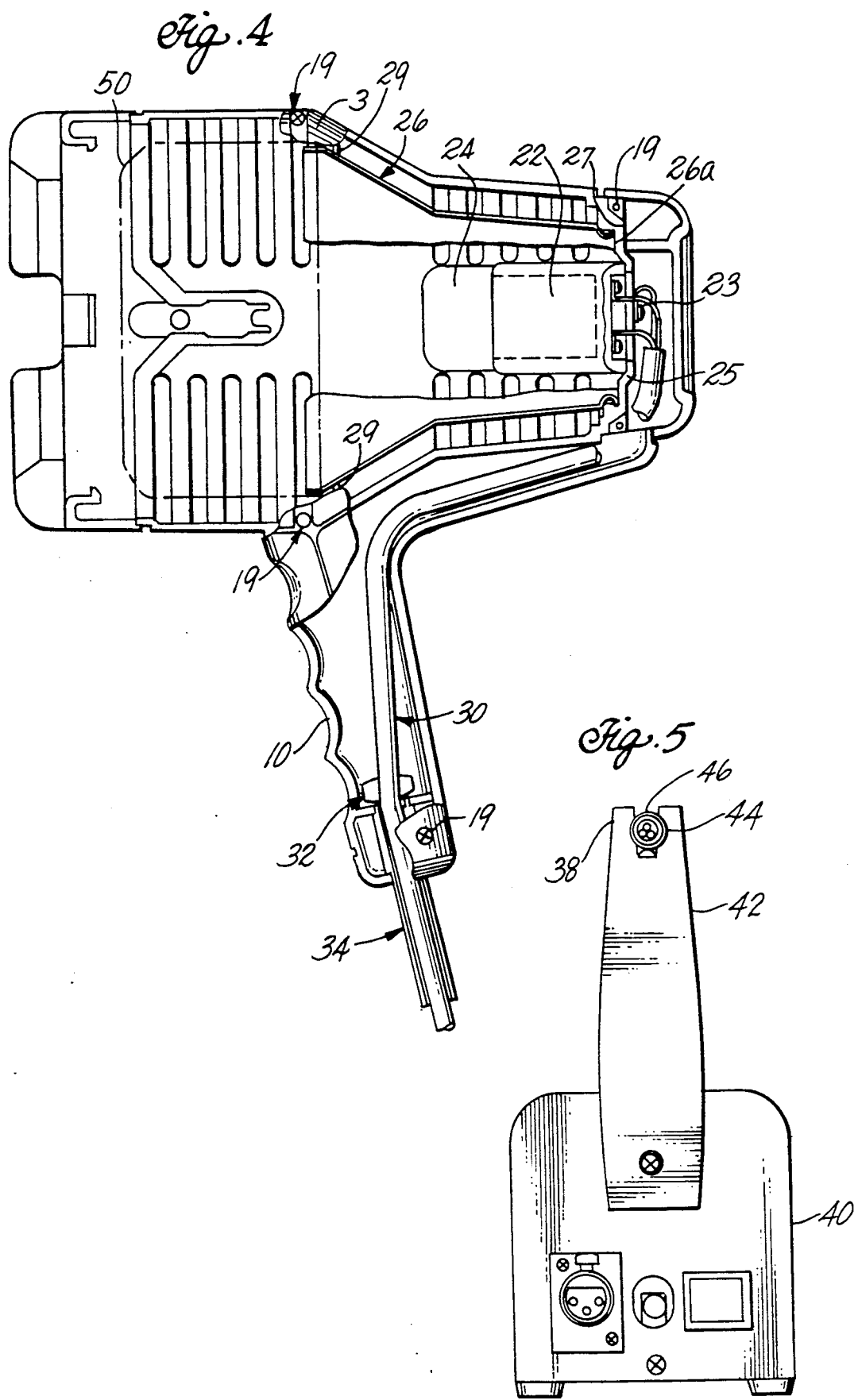

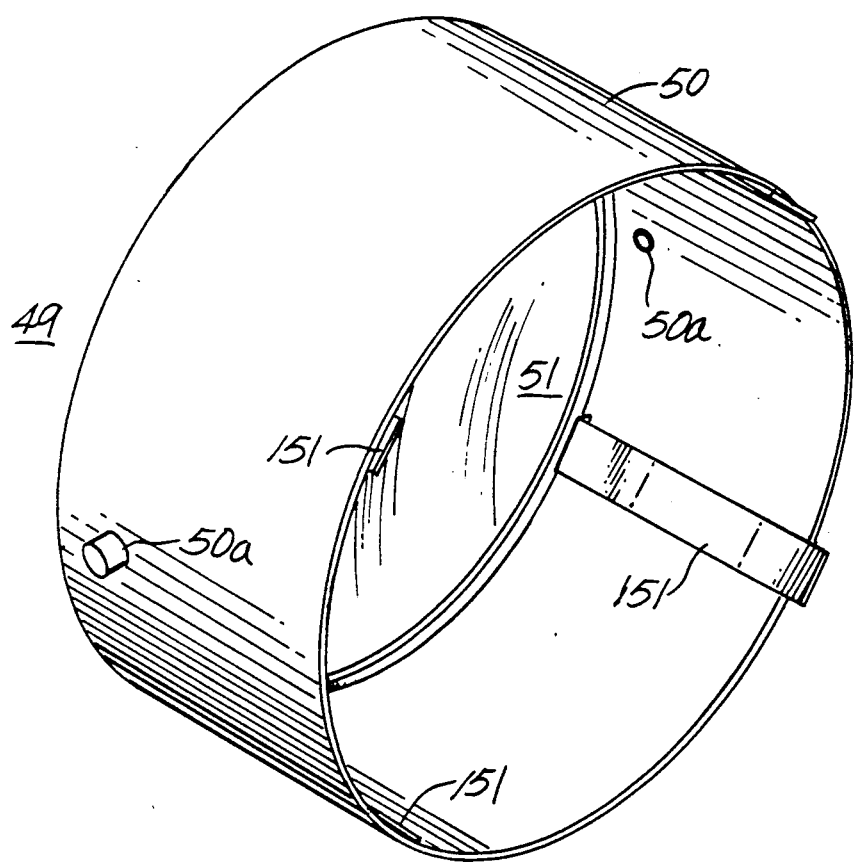

HEAT DISSIPATING HIGH INTENSITY LAMP HOUSING

BACKGROUND OF THE INVENTION

This invention relates to high powered light sources, and in particular to a housing for a high intensity ultraviolet (UV) lamp.

UV light sources are often used to spot fluid leaks in engines, microscopy, semiconductor wafer inspection, UV curing, sanitation and many other applications. As such UV lamps are typically 100 W or 160 W, they get extremely hot. Therefore, there is a need for a housing that not only allows ventilation of the source, but also keeps itself cool to the touch to avoid burning people. Such a housing should also be light weight, yet able to withstand impact from dropping or banging because these lamps are often hand held. Moreover, since the lamp source and housing are separately manufactured, it is desirable to make a housing that is easy, quick and inexpensive to assemble.

SUMMARY OF THE INVENTION

The invention is a lamp and lamp housing that is quickly and easily assembled, and is inexpensive to manufacture. Moreover, the housing is lightweight and cool to the touch, with the light source being well ventilated.

The housing encases a high intensity light source, e.g., a UV lamp. In a preferred embodiment, the housing is made of a high-impact, heat resistant plastic such as polycarbonate or polyetherimide resin. The housing has a left half and a right half, a front cover and a rear cover. The left and right halves fit together and include a handle section. The left and right halves are essentially symmetrical, each having numerous ventilation slots. Both halves are formed with elongated cut-out portions bonded by longitudinal grooves for fitting respective retaining clips, each having two tongs inwardly inclined with respect to the housing. The tongs have arcuate end portions and are resilient, so that projections from a casing or chassis for a lens filter will slide over the forward most tong and be held between the two tongs. The filter is thus quickly and easily inserted into the housing. Removal is easily performed by pressing down the forward most tongs to release the projections. The filter or bezel lens assembly is formed by a lens disposed inside a substantially bezel or cylindrical metal chassis, which extends close to the interior surface of the housing to help dissipate heat. The bezel overlaps slightly with a shield that surrounds the UV light source, to further dissipate the heat.

The front cover is fitted to the left and right housing halves for quick attachment and release. The front cover has two rearwardly extending substantially rectangular tabs with circular holes for fitting over circular protrusions from the surface of the left and right housing halves. The circular protrusions are formed on a recessed or channel-like portion of the left and right housing halves, so that the rectangular tabs fit flush on the housing. Attachment is readily performed by simply holding the tabs slightly outward and pulling them over the circular protrusion until the hole meets the protrusion. Removal is performed by simply lifting the rearward end of the tabs so that the circular protrusion comes out of the hole.

The front cover is also formed with foot-like portions so that the lamp can be rested on the front face of the housing. In the case where a splash shield is desirable, it can be fitted between ribs that support the foot-like portions and tabs that extend rearward with respect to the front cover. Space is provided between the foot portions and the splash shield, as well as between the foot portions, so that air flow through the housing can escape even when the lamp is supported on the front cover.

The rear cover also has longitudinal slots, so that air can flow through the rear cover past a socket and UV source, past the filter and through the front cover to keep the lamp cool.

In an embodiment where the lamp is separately ballasted, the lamp may be supported on a bracket mounted to the ballast.

BRIEF DESCRIPTION OF THE DRAWINGS

The above, as well as additional features and advantages of the invention will be more apparent upon reading the Detailed Description, set forth below, in conjunction with the drawings, in which:

FIG. 2 is a side view of the lamp and lamp housing;

FIG. 4 is a partially cut-away and partially exploded side view of the housing;

FIG. 5 is a view of the lamp housing mounted on an external ballast;

FIG. 9 is a view of the bezel lens assembly.

DETAILED DESCRIPTION OF THE PREFERRED EMBODIMENTS

The invention is an improved lamp and housing for the lamp, such as a UV lamp or other high intensity lamp.

Figure 1:
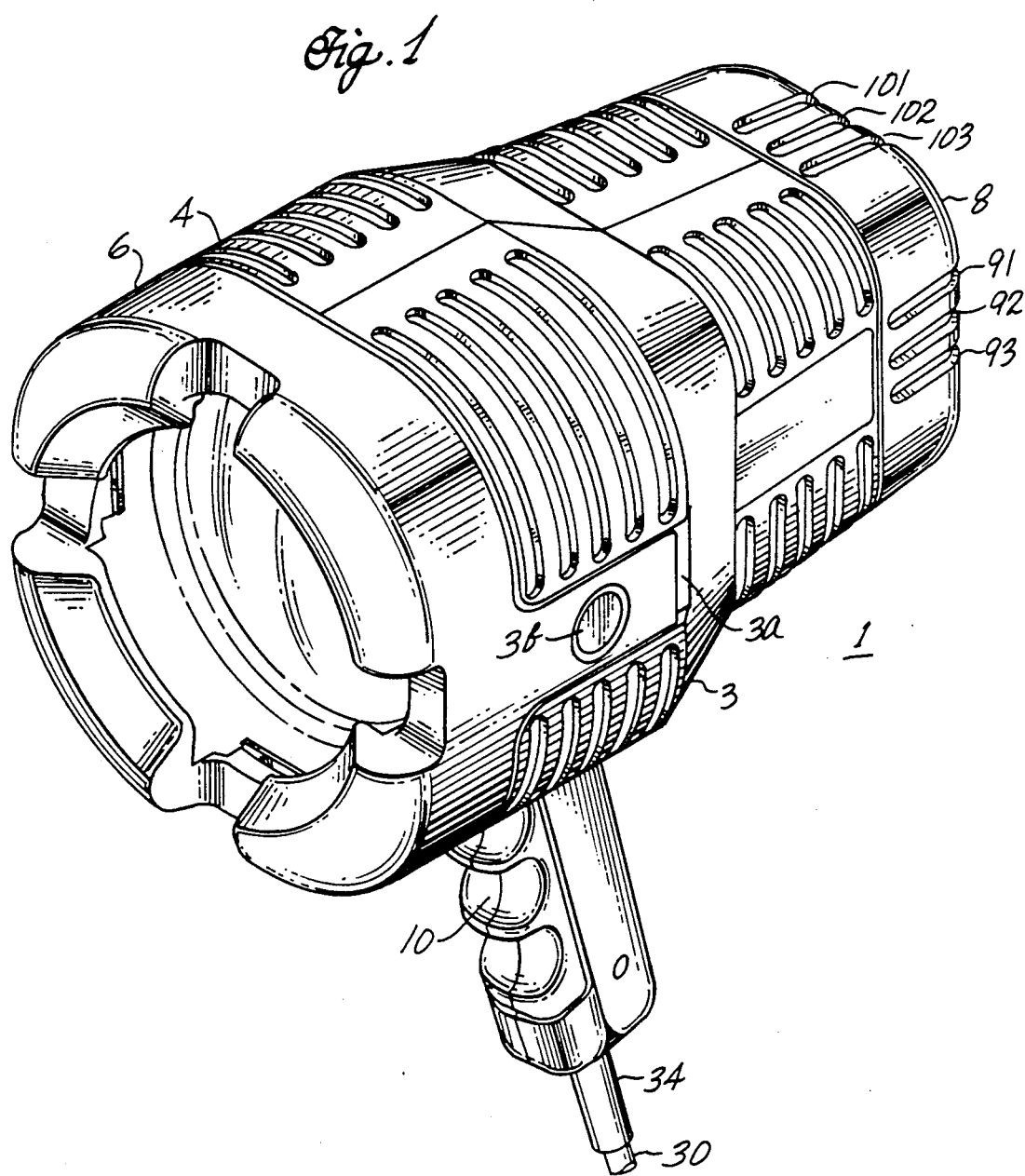
FIG. 1 is a perspective view of the lamp and lamp housing according to the invention.

As shown in FIG. 1, housing 1 includes left and right housing halves 3,4 respectively, a front cover 6, a rear cover 8 and a handle 10, preferably formed as part of the left and right housing halves. These parts of the housing are all preferably made from a high impact, heat resistant molded plastic, such as polycarbonate or polyetherimide resin (e.g., ULTEM TM 1000 made by G.E. Plastics). The lamp housing has a generally gunlike shape, and is adapted for being held at the handle which preferably has finger recesses. The lamp can be ballasted separately or self-ballasted. For self-ballasted lamps, ULTEM TM 1000 is recommended, and for separately ballasted lamps, polycarbonate is recommended. The two housing halves 3, 4 are substantially similar except to the extent necessary for fitting together. For example, these halves 3, 4 fit together using registration means (not shown) such as small protrusions in one half and corresponding holes in the other half. The halves are fastened together by means, such as screws 19 and nuts (not shown) at the front, rear and handle portion of the housing.

Rear cover 8 is attached to the housing by means such as two screws (not shown) and respective holes formed in the two housing halves. A lamp socket 22 is supported in rear cover 8 and the housing halves by suitable attachment such as a screw 23 secured in rear wall portion 25 of the housing halves 3, 4. A lamp 24 is mounted in socket 22, and a lamp shield 26 is attached to the housing 1 at rear cover 8. That is, the shield may have a circular groove 27 formed at its rear end for fitting over a circular inward protrusion 28 formed in the housing halves. Shield 26 is also supported near its front end by inwardly extending protrusions 29 formed in housing halves 3, 4 in position spaced from the housing to allow air flow.

Lamp 24 is connected to a power source via socket 22 and wires inside a cord 30 which extends through rear cover 8 and a lower portion of housing halves 3, 4 to the bottom of handle 10. Strain relief means 32 hold cord 10 to avoid any pulling on the cord and the connections to the socket. In one embodiment of the invention, at the bottom of the handle, a mounting tube 34 fits snugly around cord 30 and inside handle 10, but protrudes outside the handle. For the externally ballasted lamp, tube 34 is sized to fit into a corresponding mounting bracket assembly 38 fixed to ballast 40, as shown in FIG. 5. This bracket assembly 38 has a tube receiving portion 42 with a substantially circular bore 44 for snugly holding tube 34, so that the tube can be rotated to and held in any position 360° around. A cut-out 46 in portion 42 communicates with bore 44 and has a width slightly greater than that of cord 30, but less than the diameter of tube 34. Thus, cord 30 fits through cut-out 46, and tube 34 slides into bore 44, but cannot come out of cut-out 46.

Figure 8:
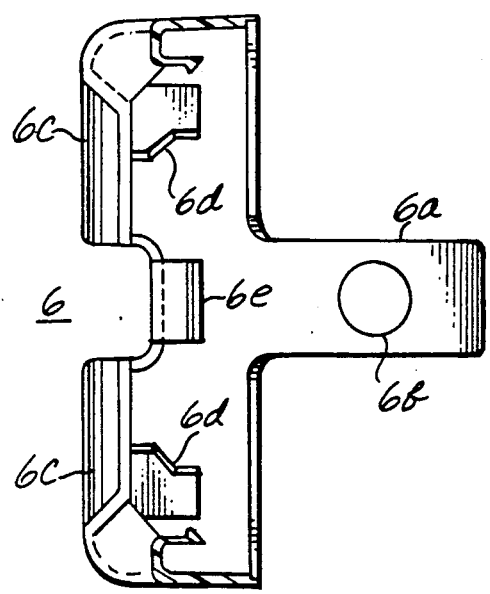
FIG. 8 is a sectional view of the front cover taken along Line B—B of FIG. 6.

In accordance with one aspect of the invention, front cover 6 is removably attached to left and right housing halves 3, 4 by a detent-type mechanism. As best shown in FIG. 8, front cover 6 has two substantially rectangular protrusions 6a, 6a with circular holes 6b, 6b formed therein. The protrusions extend from the front cover toward the rear of the housing. Both the left and right housing halves have substantially rectangular channels 3a (the other housing half having an identical channel) formed with a shape and in a position corresponding to that of the protrusions 6a, 6a. The channels have a circular raised portion, 3b (the other housing half having an identical raised portion) with a diameter slightly smaller than that of the holes 6b, 6b so that they fit in the holes. With this structure, the rectangular protrusions 6a, 6a fit in the channels 3a with the circular portions 3b in the holes 6b, 6b. The channel depth is preferably equal to the rectangular protrusion thickness so that the protrusions fit flush with the exterior of housing halves 3, 4. To remove the cover 6, the user simply pulls on the ends of the rectangular protrusions so that circular portions 3b are no longer in holes 6b, 6b. The cover 6 is thus easily detached and pulled away from housing halves 3, 4. To attach the cover to the housing, the rectangular protrusions are also pulled slightly outward and slid over the circular raised portions until the circular raised portions fit in the holes.

Figure 3A:
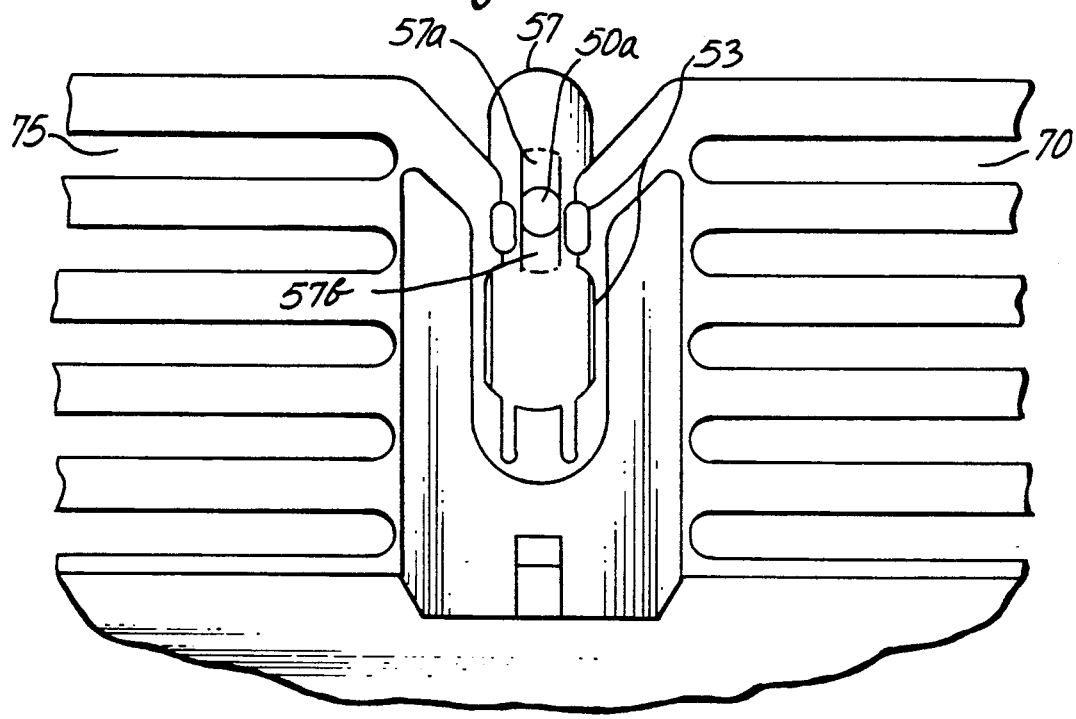
FIG. 3A is a partial view of the housing from the inside showing details of the invention.
Figure 3B:
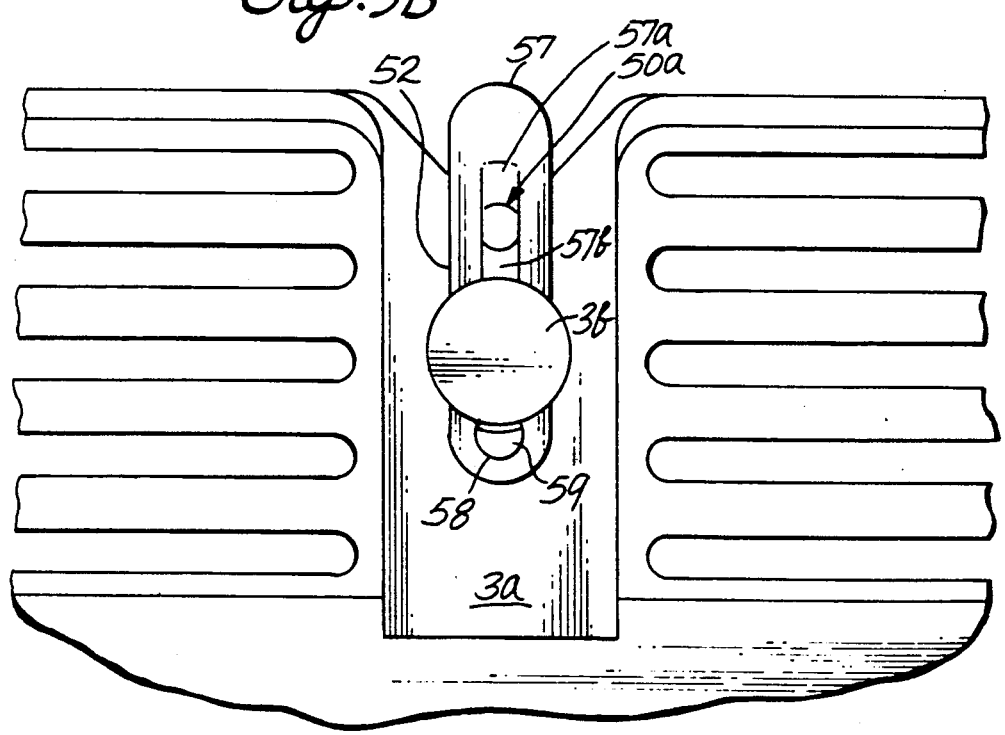
FIG. 3B is a partial view of the housing from the outside showing details of the invention.
Figure 6:
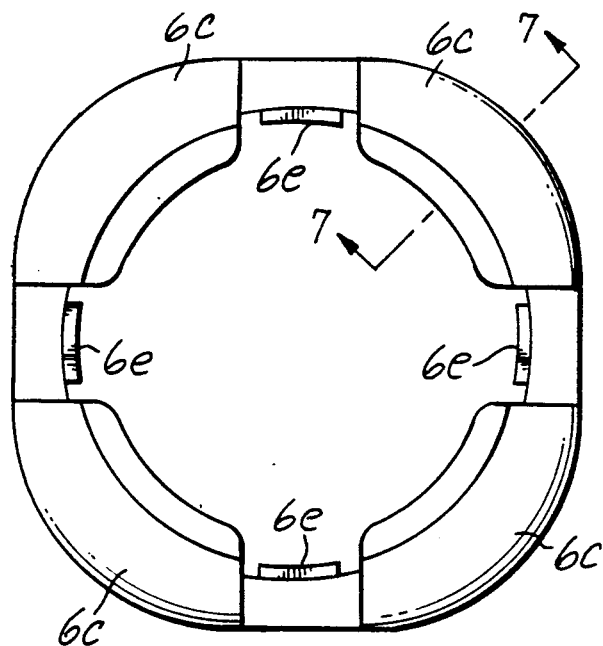
FIG. 6 is a front view of the housing.
Figure 7:
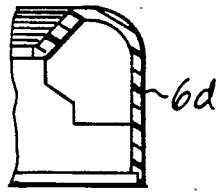
FIG. 7 is a sectional view of the front cover, taken along Line A—A of FIG. 6.

As best shown in FIGS. 3A and 3B, another detent-type mechanism is used to removably hold a bezel and filtering lens assembly 49 in place, by holding the bezel or chassis 50 which holds a filtering lens 51 (hereinafter, filter 51). The bezel is substantially cylindrical and has two projections (pins) 50a, 50a positioned 180° opposite each other for fitting into this detent-type mechanism. The projections are preferably formed by a rivet and a steel spacer. The bezel is preferably made of aluminum alloy (0.050 aluminum 1100-0 spun to 0.040). The housing halves each have a substantially elongated U-shaped notch 52 formed therein with grooves 53 around its edges for receiving two thin elongated retainers or spring clips 57. Each retainer has a pair of integral tongs 57a, 57b inwardly inclined toward one another, but with a small gap in between. The retainers are preferably metallic, such as spring steel, or any material with suitable resiliency. They are cantilevered, fitting between the circular portions 3b, and the grooves 53. The rearward end of each retainer 57 also has a hole 58 for fitting around a protrusion 59 formed in the respective housing half.

Front tongs 57a, 57a are inclined so that the projections 50a slide easily over the front tongs until engaging rear tongs 57b, 57b which prevent further movement of the projections 50a and thus the assembly 49. The front tongs snap back into their initial inclined state to prevent forward movement of the projections. Preferably, the front and rear tongs 57a, 57b have arcuate notches formed at their ends to help hold the projections 50a, 50a in place and hold the filter chassis 50 in spaced relation to the housing to allow air flow therebetween.

To remove assembly 49, the user simply pulls the front ends of retainers 57, 57 outward with respect to the housing halves 3, 4 so that the tongs 57a, 57b release the projections of the filter chassis.

As shown in FIG. 4, the bezel 50 extends sufficiently rearwardly to slightly overlap the lamp shield, which is made of the same material, to help dissipate the heat generated by the lamp. The filter 51 is held in the bezel by spring steel clips 151, as shown in FIG. 9.

In accordance with another aspect of the invention, front cover 6 also includes "feet" 6c as shown in FIGS. 1 and 6-8. Each foot 6c spans roughly 60° around the front cover, leaving about 30° between each foot. The lamp may be stored, i.e., placed down, even during usage when the lamp is hot, by placing the lamp face down on its feet 6c. The space between each foot maintains air flow through the lamp. Placing the lamp in any other position would be unstable, unless the lamp housing is made wider and flatter at its sides or at the rear cover, which would make the lamp quite bulky. Although the front cover is shown with four feet that extend approximately 60° each, a different number of feet and a different circumferential length of the feet will work as well.

The feet are reinforced by a rib 6d which is integrally formed with the rest of cover 6. The front cover may also be formed with tabs 6e that extend downward for holding a glass or plastic splash shield, and the ribs are shaped to conform to the curve of the splash shield so that the shield is held between the ribs and the tabs. These tabs 6e hold the splash shield in place, sufficiently below the ribs 6d, so that air flows underneath the ribs, around the splash shield and out of the front of the cover 6. Accordingly, even when the lamp is stored on the front cover, air flow will continue through the lamp.

In addition to the relatively open front cover, the numerous elongated slots provided in the housing achieve ventilation. The two housing halves 3, 4 each have a series of five longitudinal slots 70-74, running from the top of the recess 3b, 4b to the top center of the housing, and a series of five lower longitudinal slots 75-79 running from the lower end of the recess to the central portion of the lower end of the housing. Similarly, there is a series of five longitudinal slots 80-84 to the rear of the housing, which slots substantially extend from the position of the socket to the front edge of the bulb 24, and five lower longitudinal slots 85–89. There are also three slots 91–93 and 101–103 on each side of rear cover 8 and on the top and bottom of the rear cover. The clots extend to the back surface of the rear cover.

With the above construction, the lamp unit is quickly and easily assembled or disassembled. In particular, the front cover of the housing is easily fastened to the housing and removed therefrom, and the filter is easily positioned and secured inside the housing and easily removed therefrom. Accordingly, the filter can be replaced, and the bulb can also be easily accessible and replaced once the filter is removed.

It can be appreciated from the above-described embodiments that numerous variations will be evident to one ordinarily skilled in the art, yet will still fall within the spirit and scope of the appended claims.

What is claimed is:

1. A high-intensity ultraviolet lamp comprising:
   a filter assembly comprising a filter for the ultraviolet source; and
   a housing for encasing the ultraviolet source and filter assembly,
   wherein top, bottom, and side surfaces of the housing have a series of multiple elongated ventilation slots formed therein for dissipating heat generated by the ultraviolet source to ambient atmosphere outside the housing, and
   wherein the lamp further comprises a thermally conductive shield surrounding the source, and the filter assembly further comprises a thermally conductive chassis surrounding the filter and partially overlapping the shield, whereby the shield and chassis assist in dissipating heat to the ambient atmosphere.

2. The lamp of claim 1, further comprising means for holding the shield and chassis in spaced relation to the housing.

3. The lamp of claim 1, wherein the chassis has pins extending outward therefrom, and the lamp further comprises retainer means supported on the housing for releasably holding the filter assembly, the retainer means comprising pairs of opposing inwardly inclined tongs with respect to the housing, each pair of opposing tongs for receiving a respective one of the pins therebetween, and for releasing the pins in response to pressing the retainer means outward.

4. The lamp of claim 3, wherein the retainer means comprises at least two spring clips fixed to the housing, each of the spring clips having one of the pairs of tongs formed integrally therein.

5. The lamp of claim 3, wherein the housing comprises first and second housing halves fitted together and each having a protrusion from their exterior adjacent one end, a front cover having two elongated portions formed with apertures therein, the front cover being removably attached to the first and second housing halves at the one end by disposing the protrusions from each housing half into a respective one of the apertures.

6. The lamp of claim 5, wherein the ventilation slots are formed in each housing half.

7. The lamp of claim 5, wherein the front cover has integrally formed feet extending outward therefrom, whereby the lamp may be placed on the feet.

8. The lamp as recited in claim 7, wherein the front cover is formed with ribs for supporting each of the feet, and tabs extending rearwardly for supporting a splash shield between the ribs and the tabs, the feet and tabs being formed with space therebetween for communicating the ambient atmosphere with air flow inside the housing.

9. A high-intensity lamp comprising:
   a high-intensity lamp source;
   a filter assembly comprising a filter and a chassis surrounding the filter; and
   a housing, with a cover, for encasing the lamp source and filter assembly,
   wherein the chassis has pins extending outward therefrom, and wherein the lamp further comprises retainer means supported on the housing for releasably holding the filter assembly, the retainer means comprising pairs of opposing inwardly inclined tongs with respect to the housing, each pair of opposing tongs for receiving one of the pins therebetween, and for releasing the pins in response to pressing the retainer means outward, and wherein the housing has two projections at a front end thereof, and the front cover has two elongated portions formed with apertures therein, the front cover being removably attached to the housing at one end by disposing the two projections for the housing inside the apertures.

10. The lamp of claim 9, wherein top, bottom, and side surfaces of the housing have a series of multiple elongated ventilation slots formed therein for dissipating heat generated by the lamp source to ambient atmosphere outside the housing, and wherein the lamp further comprises a thermally conductive shield surrounding the source, and the chassis comprises a thermally conductive material and partially overlaps the shield, whereby the shield and chassis assist in dissipating heat to the ambient atmosphere.

11. The lamp of claim 10, further comprising means for holding the shield in spaced relation to the housing, and the retainer means is adapted for holding the chassis in spaced relation to the housing.

12. The lamp of claim 9, wherein the retainer means comprises at least two spring clips fixed to the housing, each of the spring clips having one of the pairs of tongs formed integrally therein.

13. The lamp of claim 9, wherein the front cover has integrally formed feet extending outward therefrom, whereby the lamp may be placed on the feet.

14. The lamp as recited in claim 13, wherein the front cover is formed with ribs for supporting each of the feet, and tabs extending rearwardly for supporting a splash shield between the ribs and the tabs, the feet and tabs being formed with space therebetween for communicating the ambient atmosphere with air flow inside the housing.

15. The lamp of claim 9, wherein each pair of tongs comprises a first tong and a second tong, each of the pins being adapted for sliding over the first tong and being engaged between the first and second tongs for reattachment of the filter assembly to the housing.

* * * * *